US009038279B2

(12) United States Patent
Chen et al.

(10) Patent No.: US 9,038,279 B2
(45) Date of Patent: May 26, 2015

(54) MECHANICAL ENCODER (71) Applicant: Industrial Technology Research Institute, Hsinchu (TW)

(72) Inventors: Ching-Chang Chen, Kaohsiung (TW); Chia-Ching Lin, Tainan (TW); Chien-Shien Yeh, Tainan (TW); Yi-Cheng Chen, New Taipei (TW); Sheng-Chih Shen, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 131 days.

(21) Appl. No.: 14/019,555

(22) Filed: Sep. 6, 2013

(65) Prior Publication Data
US 2015/0033566 A1    Feb. 5, 2015

(30) Foreign Application Priority Data

Aug. 5, 2013    (TW) .............................. 102127973 A (51) Int. Cl.
*G01B 5/24* (2006.01)
*G01D 5/06* (2006.01)
*G01D 5/04* (2006.01)
(52) U.S. Cl.
CPC ... *G01D 5/06* (2013.01); *G01D 5/04* (2013.01)
(58) Field of Classification Search
CPC ....... G01D 5/06; G01D 5/04; G01D 5/34738; G01D 5/34707
USPC .................................... 33/1 N, 1 PT, 534, 706
See application file for complete search history.

(56) References Cited

U.S. PATENT DOCUMENTS

| 5,136,522 A | 8/1992 | Loehrke |
| 5,194,896 A | 3/1993 | Buch et al. |
| 5,695,048 A | 12/1997 | Tseng |
| 5,815,091 A | 9/1998 | Dames et al. |
| 6,130,425 A * | 10/2000 | Sano ........................ 250/231.14 |

(Continued)

FOREIGN PATENT DOCUMENTS

| CN | 102692243 | 9/2012 |
| JP | 2002183904 | 6/2002 |

(Continued)

OTHER PUBLICATIONS

Engelhardt et al., "High-resolution optical position encoder with large mounting tolerances," Applied Optics 36 (13), May 1, 1997, pp. 2912-2916.

(Continued)

*Primary Examiner* — G. Bradley Bennett
(74) *Attorney, Agent, or Firm* — Jianq Chyun IP Office (57) ABSTRACT A mechanical encoder including an assembly, a flexible element, and a signal sensing module is disclosed. The assembly has a plurality of poking/stiring structure that provides poking/stirring function. The flexible element includes a first piezoelectric layer and a second piezoelectric layer. The first piezoelectric layer and the second piezoelectric layer are stacked on each other via an attach material. The flexible element is set up so that the poking/stiring structures stir/poke a first end of the flexible element, so as to output an electrical signal responsive to deformation of the flexible element. The signal sensing module receives the electrical signal to generate a position signal and a direction signal corresponding to the movement of the poking structures.

24 Claims, 7 Drawing Sheets

(56) References Cited

U.S. PATENT DOCUMENTS

| | | | |
|---|---|---|---|
| 6,194,673 | B1 | 2/2001 | Sato et al. |
| 6,201,555 | B1 | 3/2001 | Kamentser et al. |
| 6,340,801 | B1 | 1/2002 | Fukuda et al. |
| 6,388,212 | B1 | 5/2002 | Ishihara et al. |
| 6,803,685 | B2 | 10/2004 | Ikawa et al. |
| 7,002,310 | B2 | 2/2006 | Cavarec et al. |
| 7,439,650 | B2 | 10/2008 | Sawada |
| 8,013,562 | B2 | 9/2011 | Gan et al. |
| 2004/0035688 | A1 | 2/2004 | Sugahara et al. |
| 2004/0113499 | A1 | 6/2004 | Ikawa et al. |
| 2004/0164879 | A1 | 8/2004 | Yoritsune et al. |
| 2007/0193861 | A1 | 8/2007 | Yamasaki et al. |
| 2008/0192076 | A1 | 8/2008 | Suzuki |
| 2011/0016960 | A1* | 1/2011 | Debrailly ............... 73/115.07 |
| 2012/0127553 | A1* | 5/2012 | Lukic et al. ............... 33/1 PT |
| 2013/0212893 | A1* | 8/2013 | Stafford et al. ............ 33/534 |
| 2014/0326862 | A1* | 11/2014 | Lee ......................... 250/231.13 |

FOREIGN PATENT DOCUMENTS

| | | |
|---|---|---|
| JP | 2003007977 | 1/2003 |
| JP | 2009132389 | 6/2009 |
| TW | 573116 | 1/2004 |
| TW | I291232 | 12/2007 |
| TW | I312524 | 7/2009 |
| TW | I323868 | 4/2010 |
| TW | 201115571 | 5/2011 |

OTHER PUBLICATIONS

Tanaka et al., "Study on Flexible Power Generation Device Using Piezoelectric Film," Journal of Energy and Power Engineering 6, Mar. 31, 2012, pp. 353-360.

Yamamoto et al., "Flexible Displacement Sensor using Piezoelectric Polymer for Intelligent FMA," International Conference on Intelligent Robots and Systems, Oct. 29-Nov. 2, 2007, pp. 765-770.

Yamamoto et al., "Evaluation of Electro Conductive Film and Strain Gage as Displacement Sensor for Pneumatic Artificial Muscle," International Conference on Robotics and Biomimetics, Dec. 7-11, 2011, pp. 1206-1211.

Tanaka et al., "An experimental study of power generation and storage using a flexible piezoelectric device," International Journal of Applied Electromagnetics and Mechanics 39, Sep. 2012, pp. 603-608.

Du et al., "Research on the Theory of Strain Using PVDF Film and its Strain Monitoring System," Journal of Shijiazhuang Railway Institute 19 (1), Mar. 2006, pp. 1-4.

Shapiro et al., "Piezoelectric Deflection Sensor for a Bi-Bellows Actuator," IEEE/ASME Transactions on Mechatronics 18 (3), Jun. 2013, pp. 1226-1230.

* cited by examiner

FIG. 9 ly Application No. 102127973, filed
MECHANICAL ENCODER

CROSS-REFERENCE TO RELATED APPLICATIONS

This application is based upon and claims the benefit of priority from prior Taiwan Application No. 102127973, filed Aug. 5, 2013, the entire contents of which are incorporated herein by reference.

TECHNICAL FIELD

The technical field relates to an encoder, and relates to a mechanical encoder.

BACKGROUND

An encoder is used for sensing a position signal of motor rotation (movement), which serves as a feedback signal for motor control.

Rotary encoders fabricated utilizing a photolithography process can quickly increase the encoder counts and improve the accuracy rapidly. An optical encoder is achieved utilizing a light source to Irradiate a concave mirror and to irradiate a rotating slit plate, and the rotating slit plate has a rotation angle detection track. The optical encoder has a disc of transparent and opaque blocks. By emitting light from an LED to the disc, a plurality of light sensors are used to sample the disc, so as to obtain the location of a motor. A magnetic encoder uses the Hall-effect. The magnetic encoder has a rotatable magnetic disk and a magneto transistor/resistor. By a Hall element beside the magnet plate or the magneto-transistor/resistor, the magnet plate is sampled to obtain a position signal of the motor. A mechanical encoder has conduction and non-conduction blocks, and signals are sampled by sliding a contact block.

SUMMARY

In an embodiment of the disclosure, a mechanical encoder is provided, which includes an assembly, a flexible element, and a signal sensing module. The assembly has a plurality of poking structures that provides poking/stirring function. The flexible element includes a first piezoelectric layer and a second piezoelectric layer, wherein the first piezoelectric layer and the second piezoelectric layer are stacked on each other via an attach material. The flexible element has a first end and a second end, and the flexible element is set up so that the poking structures poke (stir) the first end of the flexible element, so as to output an electrical signal responsive to deformation of the flexible element. The signal sensing module receives the electrical signal and generates a position signal and a direction signal corresponding to a movement of the poking structures.

In another embodiment of the disclosure, a mechanical encoder is provided, which includes a base, a scale strip, a flexible element, and a signal sensing module. The scale strip has a fillister structure of an equidistance. The flexible element includes two flexible fiber layers, wherein the flexible element has a first end and a second end, and the first end of the flexible element is disposed inside the fillister structure of the scale strip and the second end of the flexible element is fixed on the base, so that when the scale strip moves relative to the flexible element, the fillister structure of the scale strip pokes (stirs) and deforms the flexible element, so as to generate two active sensing signals responsive to deformation of the flexible element. The signal sensing module is disposed on the base and electrically connected to the flexible element to receive the active sensing signals generated by the flexible element, so as to generate position information.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Embodiments with the disclosure include a mechanical encoder.

Figure 1:
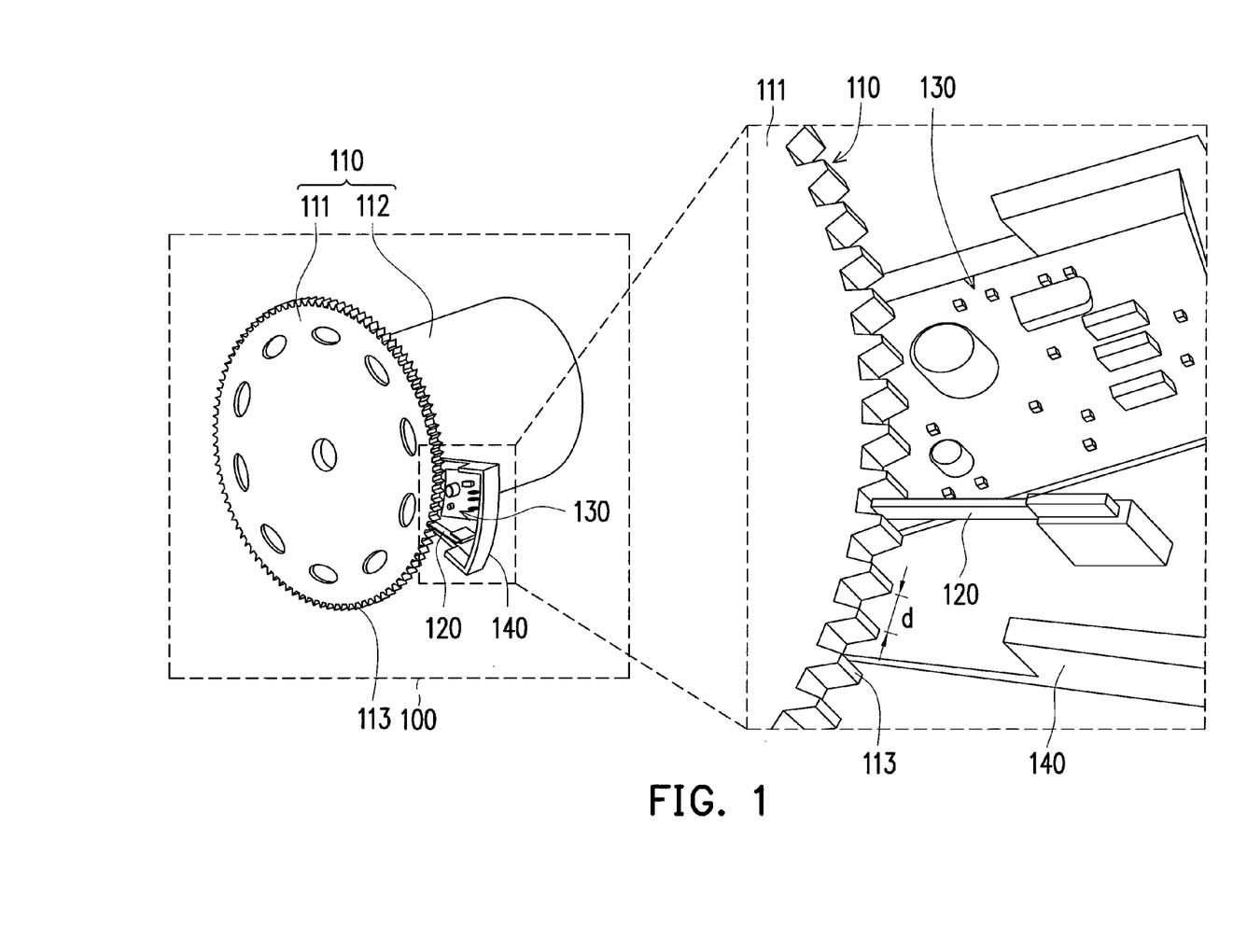
FIG. 1 is a schematic perspective view of a mechanical encoder according to an exemplary embodiment of the disclosure.

Hereinafter, embodiments with the disclosure will be described with reference to drawings. Wherever possible, the same reference numbers will be used throughout the drawings to refer to the same or like parts. FIG. 1 is a schematic perspective view of a mechanical encoder 100 according to an exemplary embodiment of the disclosure. The mechanical encoder 100 of the disclosure includes an assembly 110, a flexible element 120, and a signal sensing module 130. The assembly 110 has a plurality of poking (stirring) structures 113, wherein the poking structures 113 are disposed on the assembly 110 continuously or discontinuously. An end (free end) of the flexible element 120 is disposed/positioned between the poking structures 113 of the assembly 110. Another end (fixed end) of the flexible element 120 can be electrically connected to the signal sensing module 130. The disclosure applies the mechanical encoder 100 that includes the flexible element 120, the assembly 110, and the signal sensing module 130 to encoder positioning technology. With the poking structures 113 of the assembly 110 poking (stirring) a first end of the flexible element 120, the flexible element 120 is deformed. When the flexible element 120 is deformed, the flexible element 120 generates and outputs an active sensing signal (an electrical signal) responsive to the deformation. Position encoder information is provided according to a distance d between the poking structures 113 on the assembly 110. The signal sensing module 130 is electrically connected to a second end of the flexible element 120 to receive the active sensing signal (the electrical signal) and to generate a position signal and a direction signal corresponding to a movement of the assembly 110, thereby providing a high-precision movement/position signal. Herein, the poking structures 113 can be, for example, stir pieces, poke pieces, stir blocks, etc., or other equivalent elements.

The mechanical encoder of disclosure further includes a base 140, and the assembly 110, the flexible element 120, and the signal sensing module 130 are disposed on the base 140.

The poking structures 113 on the assembly 110 can be rotated or moved to poke (stir) the first end (free end) of the flexible element 120. The poking structures 113 can be in a continuous arrangement, a discontinuous arrangement, or an intermittent arrangement, etc., and any variation thereof belongs to the scope of the disclosure. For example, the assembly 110 can include a gear 111. In one embodiment, as shown in FIG. 1, the assembly 110 includes the gear 111 and a motor 112, wherein the poking structures 113 can be gear teeth of the gear 111, and the gear teeth are spaced by a distance. The motor 112 can drive the gear 111 to rotate, such that the gear teeth (poking structures) of the gear 111 can poke (stir) the first end of the flexible element 120.

Figure 2:
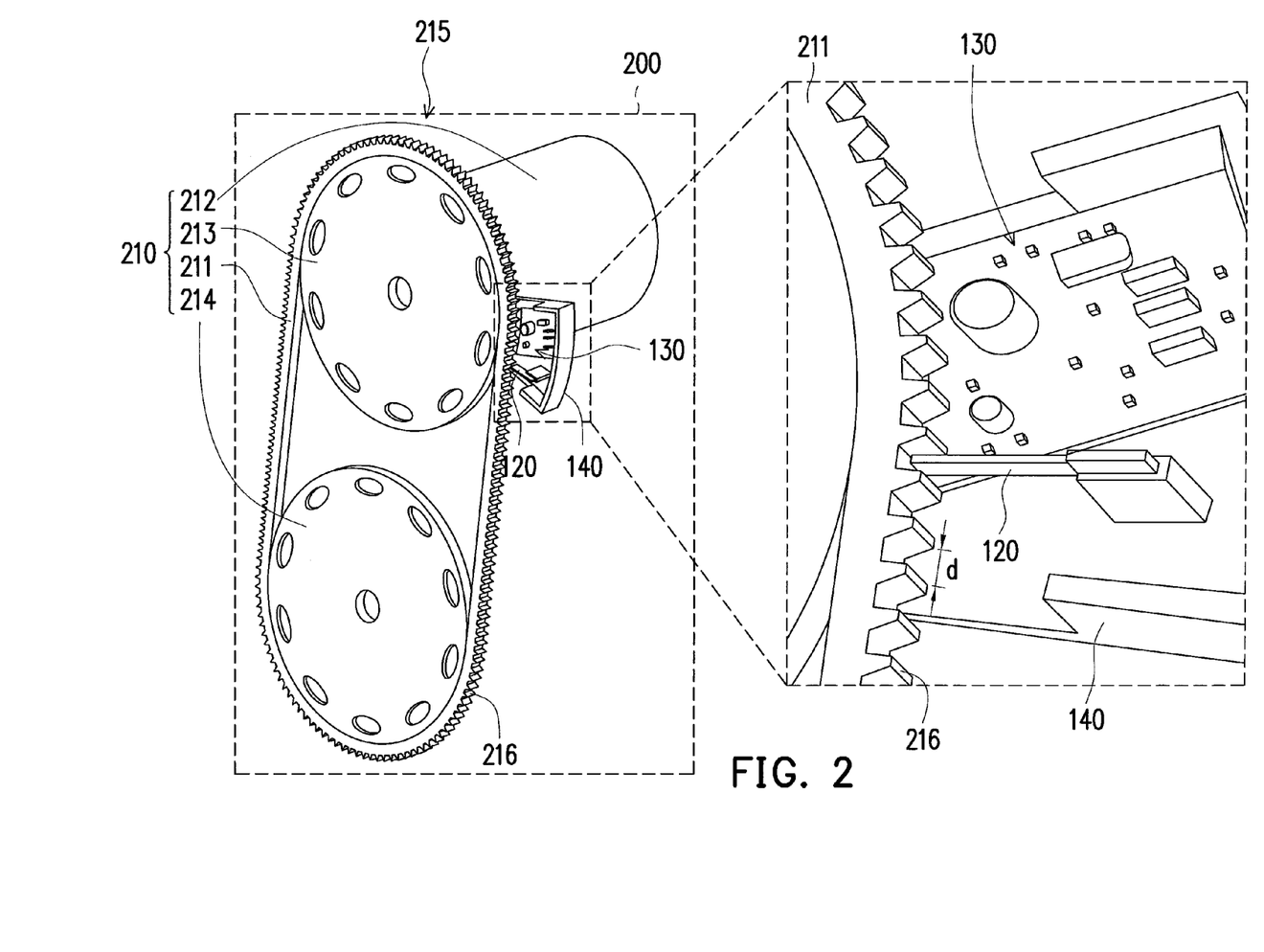
FIG. 2 is a schematic perspective view of a mechanical encoder according to another exemplary embodiment of the disclosure.

FIG. 1 is one of the embodiments of the disclosure. The embodiment of the assembly 110 with the poking structures 113 is not limited to the illustration of FIG. 1. For example, in another embodiment, the assembly with multiple poking structures includes a driving device 215 and a rack 211. FIG. 2 is a schematic perspective view of a mechanical encoder 200 according to another exemplary embodiment of the disclosure. Details of the embodiment of FIG. 2 that are identical to those of the embodiment of FIG. 1 can be found in the descriptions of FIG. 1. Referring to FIG. 2, the mechanical encoder 200 of the disclosure includes an assembly 210, the flexible element 120, and the signal sensing module 130. The assembly 210 includes the rack 211 and the driving device 215. The multiple poking structures can be a plurality of fillister structures/rack teeth 216 of the rack 211. The fillister structures/rack teeth 216 of the rack 211 are respectively spaced by the distance d. The driving device 215 drives the rack 211 to move linearly, so that the fillister structures/rack teeth 216 (as poking structures) of the rack 211 poke (stir) the first end (free end) of the flexible element 120. The driving device 215 can be realized in any form. For example, in the embodiment of FIG. 2, the driving device 215 that drives the rack 211 includes a motor 212, a first sprocket 213, and a second sprocket 214. The rack 211 is disposed around the first sprocket 213 and the second sprocket 214. The motor 212 drives the first sprocket 213 (or the second sprocket 214 in other embodiments), so as to turn the rack 211 around or move the rack 211 back and forth linearly. During the turning or linear movement of the rack 211, the fillister structures/rack teeth 216 (as poking structures) disposed on a surface of the rack 211 poke (stir) the first end of the flexible element 120.

Figure 3:
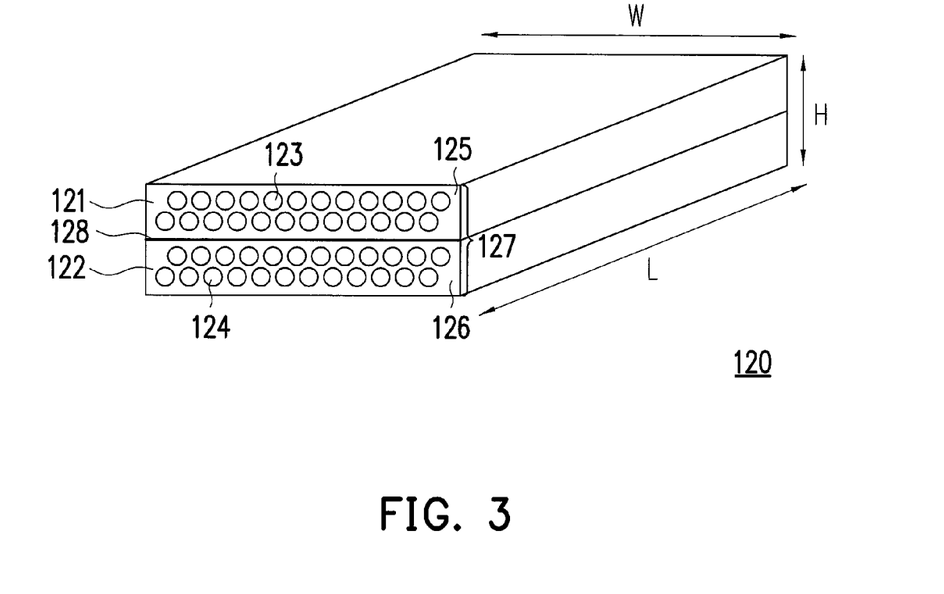
FIG. 3 is a schematic perspective view of a flexible element of the mechanical encoder in FIG. 1 according to an exemplary embodiment of the disclosure.

FIG. 3 is a schematic perspective view of the flexible element 120 of the mechanical encoder 100 in FIG. 1 according to an exemplary embodiment of the disclosure. FIG. 3 may also be referred to for details of the flexible element 120 of the mechanical encoder 200 of FIG. 2. The flexible element 120 includes a first piezoelectric layer 121 and a second piezoelectric layer 122. The first piezoelectric layer 121 includes a plurality of first piezoelectric fibers 123, wherein a first non-conductive damping material 125 is disposed between the first piezoelectric fibers 123 in the first piezoelectric layer 121. The second piezoelectric layer 122 includes a plurality of second piezoelectric fibers 124, wherein a second non-conductive damping material 126 is disposed between the second piezoelectric fibers 124 in the second piezoelectric layer 122. The first non-conductive damping material 125 can be the same as or different from the second non-conductive damping material 126. For example, the first non-conductive damping material 125 and the second non-conductive damping material 126 can be silicone, rubber, plastic, or other non-conductive elastic materials. In one embodiment, a material of the first piezoelectric layer 121 and the second piezoelectric layer 122 includes a piezoelectric ceramics fiber or the other flexible piezoelectric thin films, such as Polyvinylidene Difluoride (PVDF) or Composite PZT, or a combination thereof. A polarity direction of the first piezoelectric fibers 123 in the first piezoelectric layer 121 is different from a polarity direction of the second piezoelectric fibers 124 in the second piezoelectric layer 122. The first piezoelectric layer 121 and the second piezoelectric layer 122 may be stacked on each other via an attach material 127, wherein the attach material 127 can be a silicon substrate, silicone, plastic, viscose, and/or the other adhesive substances. For example, in an embodiment, the first piezoelectric layer 121 and the second piezoelectric layer 122 are attached to two opposite surfaces of the silicon substrate 128 so as to form the flexible element 120.

A size of the flexible element 120 is adjustable according to the needs of design of the actual products. For example, a width W of the flexible element 120 is smaller than a width of each poking structure 113 of the assembly 110, as shown in FIG. 1 (or the width W is smaller than the width of each fillister structures/rack teeth 216 (as poking structure) on the surface of the rack 211, as shown in FIG. 2). In some embodiments, the width W of the flexible element 120 is ⅓ of the width of each poking structure 113, 216 of the assembly 110. In some other embodiments, the width W of the flexible element 120 is about 100 μm, a height H of the flexible element 120 is about 5 μm, and a length L of the flexible element 120 is about 130 μm. The flexible element 120 has a first end and a second end, wherein the first end of the flexible element 120 can be disposed in the poking structures 113, 216 of the assembly 110 to contact the poking structures 113, 216, so that the poking structures 113, 216 of the assembly 110 can poke (stir) the flexible element 120 to output an electrical signal to the signal sensing module 130.

Figure 4:
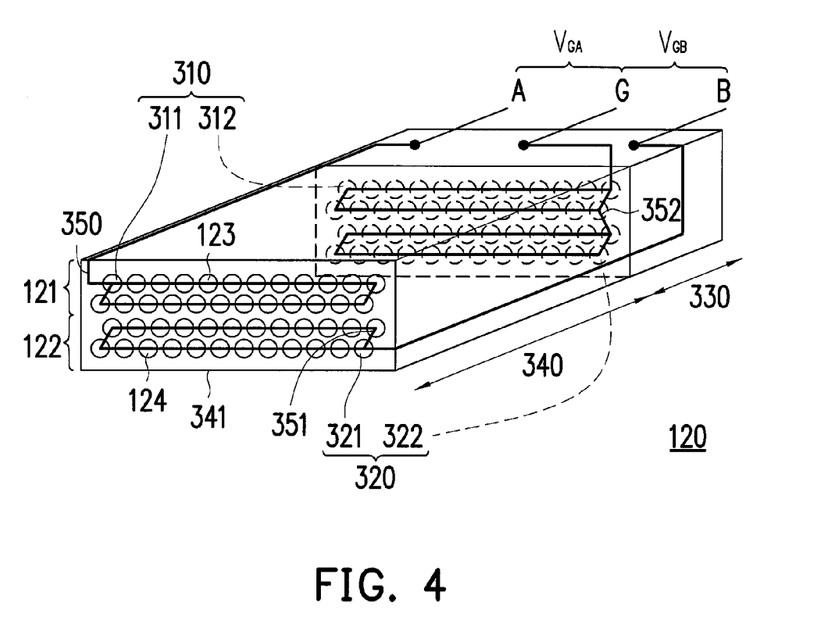
FIG. 4 is another schematic perspective view of the flexible element of the mechanical encoder in FIG. 1 according to an exemplary embodiment of the disclosure.

FIG. 4 is a schematic perspective view of the flexible element 120 of the mechanical encoder 100 in FIG. 1 according to an exemplary embodiment of the disclosure. FIG. 4 may also be referred to for details of the flexible element 120 of the mechanical encoder 200 of FIG. 2. The flexible element 120 includes an electrode portion 330 and a swing portion 340. The electrode portion 330 is fixed to the base 140. The swing portion 340 has a free end 341 that swings freely. The sizes of the electrode portion 330 and the swing portion 340 are adjustable according to the needs of design of the actual products. For example, a length of the swing portion 340 is about 130 μm, and a length of the electrode portion 330 is about 50 μm. The first piezoelectric layer 121 includes a plurality of first piezoelectric fibers 123, each including a first end and a second end. For example, as shown in FIG. 4, the first piezoelectric fiber 310 includes a first end 311 and a second end 312. The first ends 311 of the first piezoelectric fibers 123, 310 of the first piezoelectric layer 121 are connected with each other by a first metal wire 350, and a first electric contact A is formed at the second end of the flexible element 120 to be electrically connected to the first metal wire 350. The second piezoelectric layer 122 includes a plurality of second piezoelectric fibers 124, each including a first end and a second end. For example, as shown in FIG. 4, the second piezoelectric fiber 320 each includes a first end 321 and a second end 322. The first ends 321 of the second piezoelectric fibers 124, 320 of the second piezoelectric layer 122 are connected with each other by a second metal wire 351, and a second electric contact B is formed at the second end of the flexible element 120 to be electrically connected to the second metal wire 351. The second ends of the first piezoelectric fibers 123, 310 in the first piezoelectric layer 121 and the second ends of the second piezoelectric fibers 124, 320 in the second piezoelectric layer 122 are connected by a third metal wire 352, and a third electric contact G is formed at the second end of the flexible element 120 to be electrically connected to the third metal wire 352. Herein, the first electric contact A, the second electric contact B, and the third electric contact G may be disposed on the electrode portion 330.

In other words, the first piezoelectric fibers 123, 310 in the first piezoelectric layer 121 of the flexible element 120 are connected in parallel, and the second piezoelectric fibers 124, 320 in the second piezoelectric layer 122 of the flexible element 120 are connected in parallel as well. Herein, the first ends of the first piezoelectric fibers 123, 310 of the first piezoelectric layer 121 (for example, the first end 311 of the first piezoelectric fiber 310) are electrically connected to the first electric contact A, and the first ends of the second piezoelectric fibers 124, 320 of the second piezoelectric layer 122 (for example, the second end 321 of the second piezoelectric fiber 320) are electrically connected to the second electric contact B. The second ends of the first piezoelectric fibers 123, 310 of the first piezoelectric layer 121 (for example, the second end 312 of the first piezoelectric fiber 310) and the second ends of the second piezoelectric fibers 124, 320 of the second piezoelectric layer 122 (for example, the second end 322 of the second piezoelectric fiber 320) are electrically connected to the third electric contact G. Therefore, the flexible element 120 includes a double-layer stack structure of the first piezoelectric layer 121 and the second piezoelectric layer 122, and three electric contacts A, B, and G. Whereby, the flexible element 120 has two electrical outputs VGA and VGB, wherein the electrical output of the first piezoelectric layer 121 is VGA and the electrical output of the second piezoelectric layer 122 is VGB.

Figure 5A:
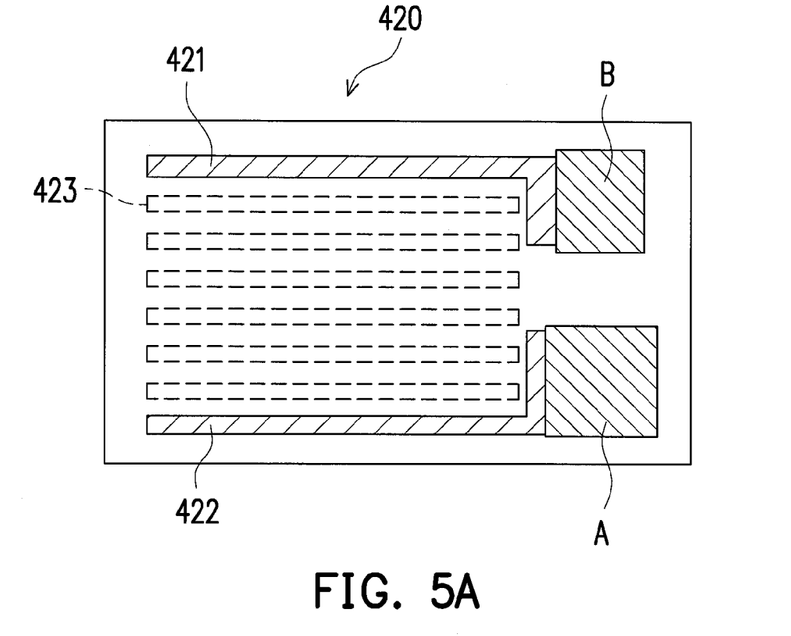
FIG. 5A is a schematic view showing an electrode of a flexible element of a mechanical encoder according to another exemplary embodiment of the disclosure.

FIG. 5A is a schematic view showing an electrode of a flexible element 420 of a mechanical encoder according to another exemplary embodiment of the disclosure. Details of the embodiment of FIG. 5A that are identical to those of the embodiments of FIGS. 1-4 can be found in the descriptions of FIGS. 1-4. In the embodiment of FIG. 5A, the first and second electric contacts A and B are disposed at a rear end of the flexible element 420 to electrically connect to the signal sensing module. Herein, the first and second electric contacts A and B form a pair of electrodes. In one embodiment, piezoelectric-fiber material, e.g. piezoelectric-fiber 423, of the first and second piezoelectric layers (not shown) in the flexible element 420 can be electrically connected to the first and second electric contacts A and B respectively through the first and second metal wires 421 and 422, so as to generate the active sensing signal (electrical signal) through the first and second electric contacts A and B. In this embodiment, a total thickness of the first and second piezoelectric layers of the flexible element 420 is about 5 μm. The length×width of the flexible element 420 is about 130 μm×100 μm.

Figure 5B:
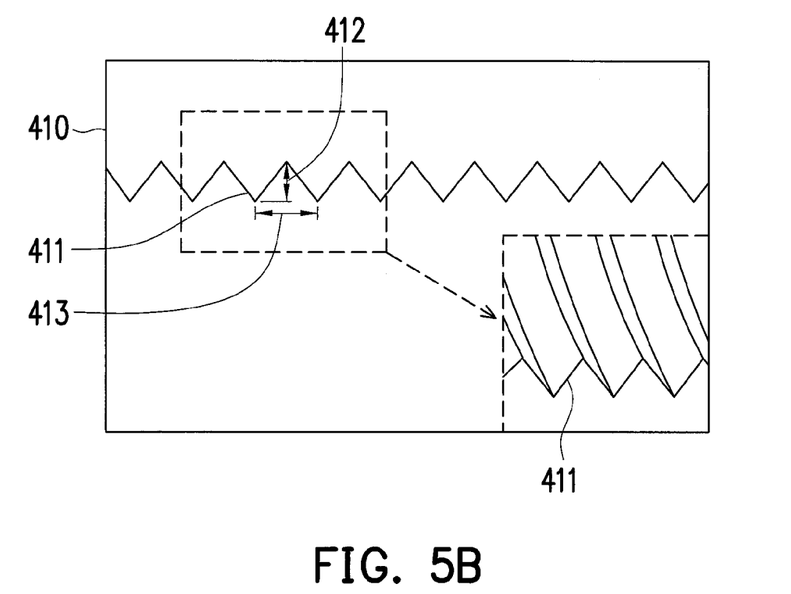
FIG. 5B is a schematic view showing a gear tooth (poking structure) of an assembly (scale strip) of a mechanical encoder according to another exemplary embodiment of the disclosure.

FIG. 5B is a schematic view showing a gear tooth (poking structure, e.g. gear tooth 411) of an assembly (scale strip) 410 of a mechanical encoder according to another exemplary embodiment of the disclosure. Details of the embodiment of FIG. 5B that are identical to those of the embodiments of FIGS. 1-4 can be found in the descriptions of FIGS. 1-4. As shown in FIG. 5B, in one embodiment, a depth 412 of the gear teeth (protrude teeth) of the assembly 410 is larger than 6 μm. A pitch 413 of the gear teeth (protrude teeth) is about 10 μm.

Figure 6A:
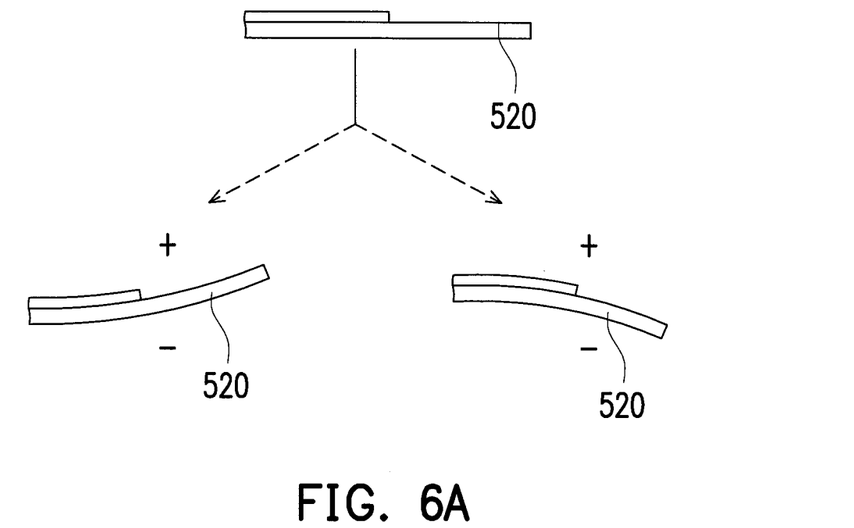
FIGS. 6A and 6B respectively illustrate movement states of a flexible element of a mechanical encoder according to an exemplary embodiment of the disclosure.
Figure 6B:
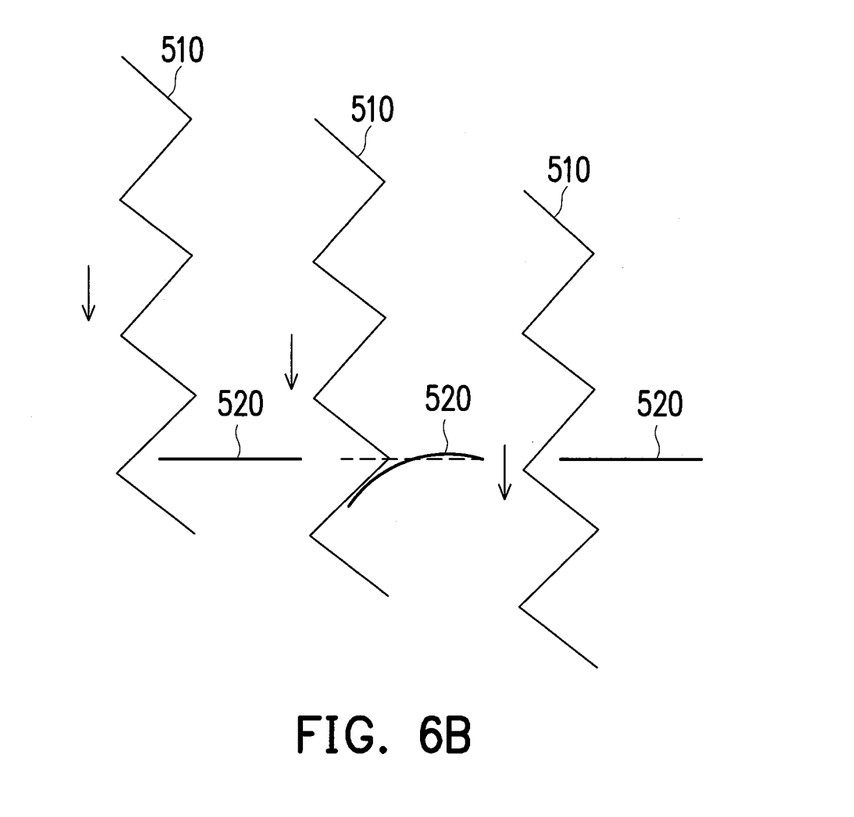

FIGS. 6A and 6B respectively illustrate movement states of a flexible element 520 of a mechanical encoder according to an exemplary embodiment of the disclosure. Details of the embodiment of FIGS. 6A-6B that are identical to those of the embodiments of FIGS. 1, 2, 3, 4, 5A and/or 5B can be found in the descriptions of FIGS. 1, 2, 3, 4, 5A and/or 5B. In one embodiment, when the assembly 510 includes a gear (or a scale strip), the flexible element 520 is located between two gear teeth (protrude teeth) of the gear (or the scale strip). When a driving device (for example, a motor, etc.) drives the gear to rotate (or drives the scale strip to move), the gear teeth (protrude teeth, as the poking structures) of the gear (or the scale strip) can drive a free end of the flexible element 520 to deform. According to FIG. 6A, when the flexible element 520 is bent toward one side, an inner concave side of the flexible element 520 is electropositive and an outer convex side of the flexible element 520 is electronegative, thereby outputting a signal. When the flexible element 520 is bent toward another side, the inner concave side of the flexible element 520 is electronegative and the outer convex side of the flexible element 520 is electropositive, thereby outputting a signal. According to FIG. 6B, when the gear teeth (protrude gear) of the assembly 510 move toward a direction, the flexible element 520 stops between two gear teeth (protrude teeth), which is an initial state. When the flexible element 520 touches the moving gear teeth (protrude gear), the free end of the flexible element 520 is poked (stirred) to bend, and the flexible element 520 is bent and deformed. When the free end of the flexible element 520 passes the gear teeth (protrude gear) and enters a next distance space (the fillister structure) between the gear teeth (protrude gear), the flexible element 520 restores. Whereby, when the flexible element 520 touches the moving gear teeth (protrude gear), the flexible element 520 is poked (stirred) to bend, and the piezoelectric material of the flexible element 520 generates a signal and delivers the same to the signal sensing module.

Figure 7:
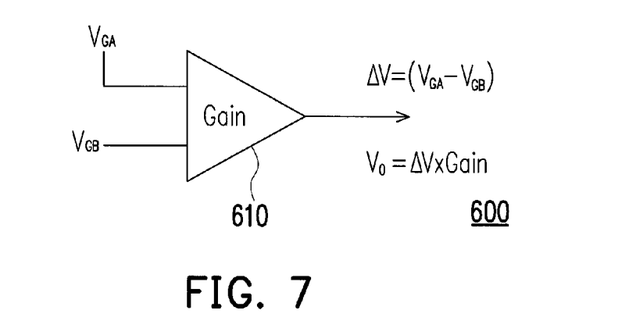
FIG. 7 is a circuit diagram of a signal sensing module of a mechanical encoder according to an exemplary embodiment of the disclosure.

FIG. 7 is a circuit diagram of a signal sensing module 600 of a mechanical encoder according to an exemplary embodiment of the disclosure. Details of the embodiment of FIG. 7 that are identical to those of the embodiments of FIGS. 1, 2, 3, 4, 5A, 5B, FIG. 6A, and/or FIG. 6B can be found in the descriptions of FIGS. 1, 2, 3, 4, 5A, 5B, FIG. 6A, and/or FIG. 6B. In the embodiment of FIG. 7, the signal sensing module 600 includes a differential amplifier 610. The first and second electric contacts A and B of the first and second piezoelectric layers in the flexible element are connected to a first input and a second input of the differential amplifier 610, respectively. The third electric contact G of the flexible element is coupled to a reference voltage (for example, a ground voltage or other fixed voltages). Therefore, the flexible element can input the active sensing signals (the electrical signals) VGA and VGB to the differential amplifier 610, respectively. When $\Delta V=(V_{GA}-V_{GB})$, an output of the differential amplifier 610 is $Vo=\Delta V \times Gain$. Thus, when Vo>0, it indicates that the poking structures (for example, gear teeth/protrude teeth) are in a forward movement, and when Vo<0, it indicates that the poking structures (for example, gear teeth/protrude teeth) are in a reverse movement.

Figure 8A:
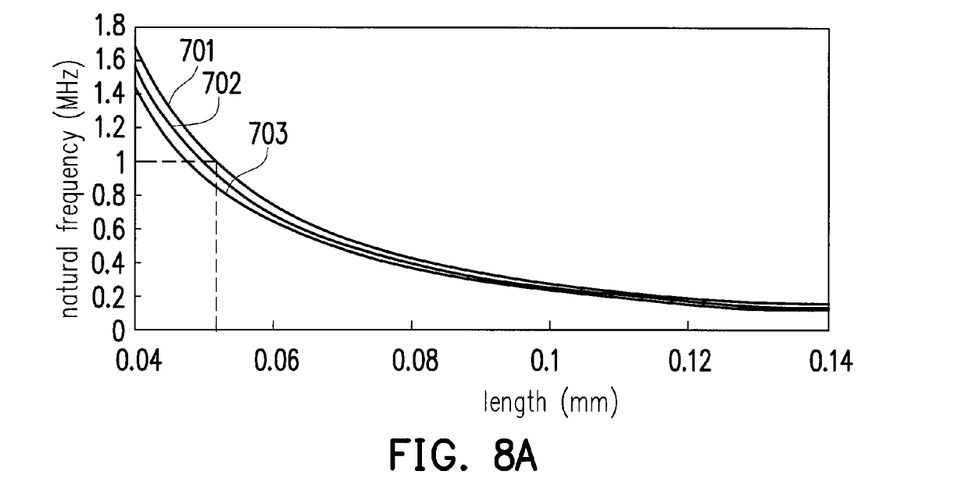
FIG. 8A shows characteristic curves related to a size and a frequency response of a flexible element with different material ratios according to an exemplary embodiment of the disclosure.
Figure 8B:
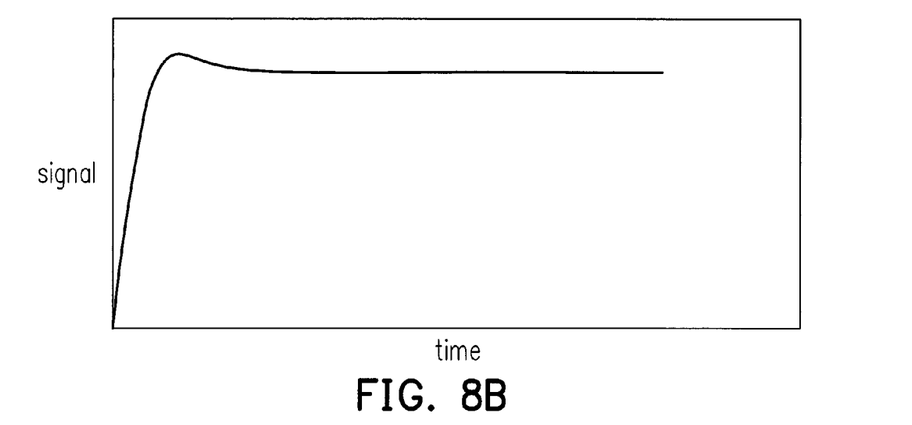
FIG. 8B shows a characteristic curve of a response damping design of a flexible element according to an exemplary embodiment of the disclosure.

FIG. 8A and FIG. 8B show characteristic curves related to a flexible element of a mechanical encoder according to an exemplary embodiment of the disclosure. Details of the embodiment of FIGS. 8A-8B that are identical to those of the embodiments of FIGS. 1, 2, 3, 4, 5A and/or 5B can be found in the descriptions of FIGS. 1, 2, 3, 4, 5A and/or 5B. In one embodiment, a structure design of the flexible element can be length (L): 130 μm; width (W): 100 μm; thickness (H): 5 μm. The flexible element has adequate rigidity and damping characteristics, and thus the mechanical encoder has an adequate bandwidth, which prevents generation of noise of the sensing signal that results from structure vibration. In order that the flexible element can have adequate rigidity and damping characteristics, in this embodiment, the size and material characteristics of the flexible piezoelectric fibers are adjustable according to the actual application.

For example, FIG. 8A shows characteristic curves related to a size and a frequency response of a flexible element with different material ratios according to an exemplary embodiment of the disclosure, wherein a horizontal axis represents the length (mm) of the flexible element and a vertical axis represents a natural frequency response (MHz). Herein, the curve 701 represents a characteristic curve of a flexible element composed of 90% piezoelectric-ceramics (piezoelectric fiber) and 10% silicone (damping material). The curve 702 represents a characteristic curve of a flexible element composed of 50% piezoelectric-ceramics (piezoelectric fiber) and 50% silicone (damping material). The curve 703 represents a characteristic curve of a flexible element composed of 30% piezoelectric-ceramics (piezoelectric fiber) and 70% silicone (damping material). FIG. 8B shows a characteristic curve of a response damping design of a flexible element according to an exemplary embodiment of the disclosure, wherein a horizontal axis represents time and a vertical axis represents signal. In the embodiment of FIG. 8B, a material ratio of the flexible element is 90% piezoelectric-ceramics to 10% silicone, wherein the structure rigidity design of the poking structures can be a response bandwidth of about 150 KHz-1 MHz. Thus, the flexible element having the suitable damping design can avoid noise.

In other embodiments, the size of the flexible element of the mechanical encoder can be adjusted to decide the response bandwidth. For example, when the length L of the flexible element is about 130 μm, the width W is about 100 μm, and the height (thickness) H is about 5 μm, and the material ratio of the flexible element is 90% piezoelectric-ceramics to 10% silicone, the bandwidth of the mechanical encoder can reach 150 KHz. When the length L of the flexible element is 50 μm, the width W is 10 μm, and the height (thickness) H is 5 μm, and the material ratio of the flexible element is 90% piezoelectric-ceramics to 10% silicone, the bandwidth of the mechanical encoder can reach 1 MHz.

Figure 9:
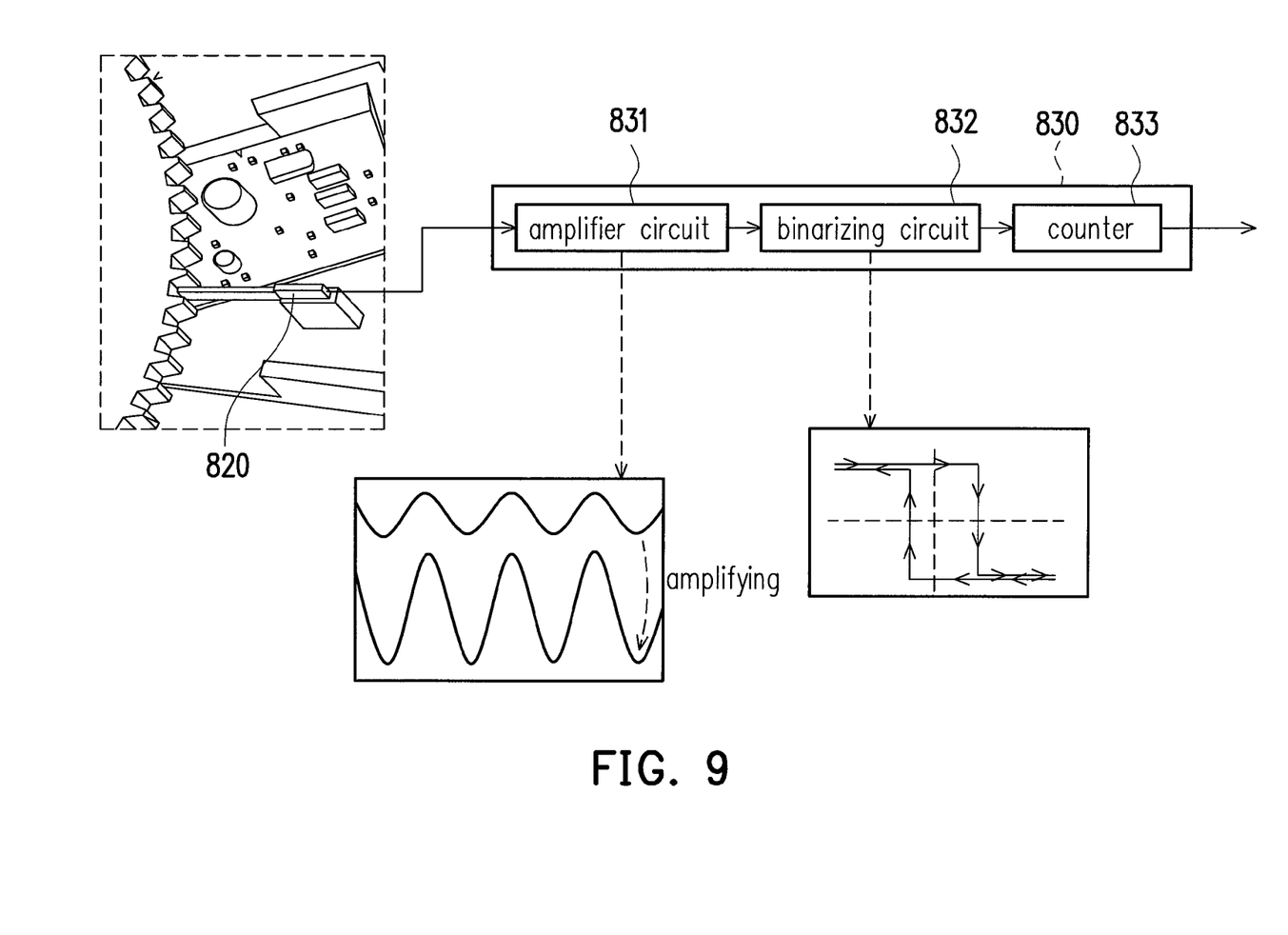
FIG. 9 is a circuit block diagram of a signal sensing module of a mechanical encoder according to an exemplary embodiment of the disclosure.

FIG. 9 is a circuit block diagram of a signal sensing module 830 of a mechanical encoder according to an exemplary embodiment of the disclosure. Details of the embodiment of FIG. 9 that are identical to those of the embodiments of FIGS. 1, 2, 3, 4, 5A and/or 5B can be found in the descriptions of FIGS. 1, 2, 3, 4, 5A and/or 5B. The signal sensing module 830 receives the electrical signal generated by a flexible element 820, and a position signal and a direction signal are generated through the signal sensing module 830, wherein the signal sensing module 830 includes an amplifier circuit 831, a binarizing circuit 832, and a counter 833. The amplifier circuit 831 of the signal sensing module 830 amplifies a signal amplitude of a sensing signal (the electrical signal) generated by the flexible element 820, so as to output an amplified signal. The binarizing circuit 832 is coupled to the amplifier circuit 831 and transfers the amplified signal with amplified amplitude to a digital signal of high/low level. The counter 833 is coupled to the binarizing circuit 832 to receive the digital signal and counting the digital signal outputted by the binarizing circuit 832, so as to obtain a movement value or an angle of the assembly (or the scale strip) having the plurality of poking structures.

The embodiments of the mechanical encoder are not limited to the above descriptions. For example, in another embodiment, the mechanical encoder of the disclosure includes a base, a scale strip, a flexible element, and a signal sensing module. The scale strip, the flexible element, and the signal sensing module are disposed on the base. The scale strip has a fillister structure of an equidistance. The flexible element includes two flexible fiber layers. The flexible element has a first end and a second end, wherein the second end of the flexible element is fixed on the base and the first end of the flexible element is disposed inside the fillister structure of the scale strip, so that the fillister structure of the scale strip pokes (stirs) and deforms the flexible element when the scale strip moves relative to the flexible element, thereby generating two active sensing signals (for example, the electrical signal). After receiving the two active sensing signals generated by the flexible element, the signal sensing module generates the position information. At the same time, the signal sensing module judges a movement direction of the scale strip according to a voltage difference between the two active sensing signals.

Herein, a plurality of protrude teeth are disposed between adjacent fillister structures of the scale strip. The disclosure further includes a driving device driving the scale strip to move.

The flexible element includes at least two flexible fiber layers, wherein the two flexible fiber layers are fixed by a silicone. The two flexible fiber layers include a first piezoelectric layer and a second piezoelectric layer. The first piezoelectric layer includes a plurality of first piezoelectric fibers. The first piezoelectric fiber includes a first end and a second end, and the first end of each of the first piezoelectric fibers is connected to each other by a first metal wire, and a first electric contact A is formed at the second end of the flexible element to be electrically connected to the first metal wire. The second piezoelectric-fiber layer includes a plurality of second piezoelectric fibers, and the second piezoelectric fiber includes a first end and a second end, wherein the first end of each of the second piezoelectric fibers is connected to each other by a second metal wire, and a second electric contact B is formed at the second end of the flexible element to be electrically connected to the second metal wire. The second end of each of the first piezoelectric fibers and the second end of each of the second piezoelectric fibers are connected by a third metal wire, and a third electric contact G is formed at the second end of the flexible element to be electrically connected to the third metal wire.

Except the scale strip, other elements of this embodiment of the disclosure are similar to those of the above-mentioned embodiments and thus are not repeated hereinafter. Details of the scale strip of this embodiment may be found in the descriptions of the assembly (the scale strip) 410 of FIG. 5B. Details of the flexible element and the signal sensing module of this embodiment can be found in the descriptions of the flexible element 120 and the signal sensing module 130 of FIGS. 1, 2, 3, and/or 4. Or, details of the flexible element of this embodiment can be found in the descriptions of the flexible element 420 of FIG. 5A or in the descriptions of the flexible element 520 of FIGS. 6A-6B. Or, details of the signal sensing module of this embodiment can be found in the descriptions of the signal sensing module 600 of FIG. 7 or in the descriptions of the signal sensing module 830 of FIG. 9.

The embodiments of the disclosure are at least as follows. The embodiment of the disclosure provides a mechanical encoder, which utilizes the element width ratio design (for example, 3:1 or the other ratio values) of the scale strip (or the assembly having poking structures) and the flexible element to make the alignment assembly design of the scale strip and the flexible element simple and effective. The embodiment of the disclosure provides the mechanical encoder with simple assembly, wherein the flexible element is disposed in the fillister structure of the scale strip, and the assembly of the scale strip and the flexible element are simplified. The embodiment of the disclosure provides the mechanical encoder with low noise, wherein the flexible element includes the piezoelectric fiber and the damping material, and through the design of geometric size and material ratio, the rigidity, bandwidth, and response damping characteristic of the flexible element can be adjusted to adjust the bandwidth and damping response of the mechanical encoder. Therefore, after the flexible element is poked (stirred), the restoration speed situation of the flexible element can match the movement speed of the scale strip, so as to avoid noise that results from low damping response of the flexible element.

In summary, the mechanical encoder of the disclosure utilizes the poking structures to poke (stir) and deform the flexible element. When the flexible element generates an active sensing signal due to the deformation, position encoder information is provided according to the distance between the poking structures. The active sensing signal is received through the signal sensing module, and a position signal and a direction signal are generated to provide a high precision movement signal.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A mechanical encoder, comprising:
   an assembly having a plurality of poking structures that provides poking/stirring function;
   a flexible element comprising a first piezoelectric layer and a second piezoelectric layer being stacked on each other via an attach material, wherein the flexible element having a first end and a second end, and the flexible element is set up so that the plurality of poking structures stir/poke the first end of the flexible element, so as to output an electrical signal responsive to deformation of the flexible element; and
   a signal sensing module receiving the electrical signal and generating a position signal and a direction signal corresponding to a movement of the poking structures.

2. The mechanical encoder of claim 1, wherein the poking structures are disposed on the assembly continuously or discontinuously.

3. The mechanical encoder of claim 1, wherein the assembly comprises a gear, and the poking structures are a plurality of gear teeth of the gear.

4. The mechanical encoder of claim 3, wherein the assembly further comprises a motor driving the gear to rotate.

5. The mechanical encoder of claim 1, wherein the assembly comprises a rack, and the poking structures are a plurality of rack teeth of the rack.

6. The mechanical encoder of claim 5, wherein the assembly further comprises a driving device driving the rack to move linearly.

7. The mechanical encoder of claim 6, wherein the driving device comprises a first sprocket, a second sprocket, and a motor, wherein the rack is disposed around the first sprocket and the second sprocket, and the motor drives the first sprocket or the second sprocket to rotate so as to move the rack linearly.

8. The mechanical encoder of claim 1, wherein a width of the flexible element is smaller than a width of each of the poking structures.

9. The mechanical encoder of claim 8, wherein the width of the flexible element is ⅓ of the width of each of the poking structures.

10. The mechanical encoder of claim 1, wherein the attach material is a silicone.

11. The mechanical encoder of claim 1, wherein the first piezoelectric layer comprises a plurality of first piezoelectric fibers each comprising a first end and a second end, and the first ends of the plurality of first piezoelectric fibers are connected to each other by a first metal wire, and a first electric contact is formed at the second end of the flexible element to be electrically connected to the first metal wire;
   the second piezoelectric layer comprises a plurality of second piezoelectric fibers each comprising a first end and a second end, and the first ends of the plurality of second piezoelectric fibers are connected to each other by a second metal wire, and a second electric contact is formed at the second end of the flexible element to be electrically connected to the second metal wire; and
   the second ends of the plurality of first piezoelectric fibers in the first piezoelectric layer and the second ends of the second piezoelectric fibers in the second piezoelectric layer are connected by a third metal wire, and a third electric contact is formed at the second end of the flexible element to be electrically connected to the third metal wire.

12. The mechanical encoder of claim 11, wherein the third electric contact is coupled to a reference voltage, and the first electric contact and the second electric contact output the electrical signal to the signal sensing module.

13. The mechanical encoder of claim 11, wherein a first non-conductive damping material is disposed between the plurality of first piezoelectric fibers in the first piezoelectric layer, and a second non-conductive damping material is disposed between the plurality of second piezoelectric fibers in the second piezoelectric layer.

14. The mechanical encoder of claim 1, further comprising a base, wherein the assembly, the flexible element and the signal sensing module are disposed on the base.

15. The mechanical encoder of claim 1, wherein the signal sensing module comprises:
   an amplifier circuit, amplifying a signal amplitude of the electrical signal generated by the flexible element so as to output an amplified signal;
   a binarizing circuit, coupled to the amplifier circuit and transferring the amplified signal to a digital signal; and a counter, coupled to the binarizing circuit to receive the digital signal and counting the digital signal so as to obtain a movement value or an angle of the assembly.

16. A mechanical encoder, comprising:
a base;
a scale strip, having a fillister structure with an equidistance;
a flexible element comprising two flexible fiber layers and having a first end and a second end, the first end of the flexible element being disposed inside the fillister structure of the scale strip and the second end of the flexible element being fixed on the base, so that when the scale strip moves relative to the flexible element, the fillister structure of the scale strip stirs/pokes and deforms the flexible element to generate two active sensing signals responsive to deformation of the flexible element; and
a signal sensing module, disposed on the base and electrically connected to the flexible element to receive the active sensing signals generated by the flexible element and generate position information.

17. The mechanical encoder of claim 16, wherein a plurality of protrude teeth are disposed between adjacent fillister structures of the scale strip.

18. The mechanical encoder of claim 17, further comprising a driving device driving the scale strip to move.

19. The mechanical encoder of claim 16, wherein the two flexible fiber layers are fixed on each other by a silicone.

20. The mechanical encoder of claim 19, wherein the two flexible fiber layers comprise a first piezoelectric layer and a second piezoelectric layer, wherein the first piezoelectric-fiber layer comprises a plurality of first piezoelectric fibers each having a first end and a second end, and the first ends of the plurality of first piezoelectric fibers are connected to each other by a first metal wire, and a first electric contact is formed at the second end of the flexible element to be electrically connected to the first metal wire;
the second piezoelectric-fiber layer comprises a plurality of second piezoelectric fibers each having a first end and a second end, and the first ends of the plurality of second piezoelectric fibers are connected to each other by a second metal wire, and a second electric contact is formed at the second end of the flexible element to be electrically connected to the second metal wire; and
the second ends of the plurality of first piezoelectric fibers and the second ends of the second piezoelectric fibers are connected by a third metal wire, and a third electric contact is formed at the second end of the flexible element to be electrically connected to the third metal wire.

21. The mechanical encoder of claim 20, wherein the third electric contact is coupled to a reference voltage, and the first electric contact and the second electric contact output the active sensing signals to the signal sensing module.

22. The mechanical encoder of claim 20, wherein a first non-conductive damping material is disposed between the plurality of first piezoelectric fibers in the first piezoelectric-fiber layer, and a second non-conductive damping material is disposed between the plurality of second piezoelectric fibers in the second piezoelectric-fiber layer.

23. The mechanical encoder of claim 16, wherein the movement signal sensing module comprises:
an amplifier circuit, amplifying a signal amplitude of the active sensing signals generated by the flexible element so as to output an amplified signal;
a binarizing circuit, coupled to the amplifier circuit and transferring the amplified signal to a digital signal; and
a counter, coupled to the binarizing circuit to receive the digital signal and counting the digital signal so as to obtain a movement value or an angle of the assembly.

24. The mechanical encoder of claim 16, wherein the movement signal sensing module judges a movement direction of the scale strip according to a voltage difference of the two active sensing signals.

* * * * *